US006094537A

United States Patent [19]
Okazaki et al.

[11] Patent Number: 6,094,537
[45] Date of Patent: Jul. 25, 2000

[54] AUTO FOCUS CAMERA

[75] Inventors: Seishin Okazaki, Nara; Kazuhiko Sugimoto, Shijyonawate, both of Japan

[73] Assignee: Sanyo Electric Co., Ltd., Osaka, Japan

[21] Appl. No.: 09/262,916

[22] Filed: Mar. 5, 1999

[30] Foreign Application Priority Data

Mar. 9, 1998 [JP] Japan .................................. 10-056884

[51] Int. Cl.[7] .............................. G03B 13/36; G02B 7/04
[52] U.S. Cl. ........................ 396/127; 348/356; 250/201.7
[58] Field of Search .................................... 396/127, 125, 396/133, 89; 348/356, 355, 354; 250/201.7, 201.2

[56] References Cited

U.S. PATENT DOCUMENTS 4,600,832 7/1986 Grund ..................................... 396/127
4,903,135 2/1990 Ohtake et al. ...................... 396/127 X
5,249,058 9/1993 Murata et al. ...................... 396/127 X
5,566,380 10/1996 Honma ................................ 396/125 X
5,757,429 5/1998 Haruki .................................... 348/354

*Primary Examiner*—W. B. Perkey
*Attorney, Agent, or Firm*—Armstrong, Westerman, Hattori, McLeland & Naughton

[57] ABSTRACT

An auto focus camera includes a motor drive circuit. This motor drive circuit causes an AF lens to move by a first predetermined amount a time. A micro-computer determines AF evaluation values at respective lens positions. The AF evaluation values thus determined have a mountain-like characteristic form with a focal point as a summit. The micro-computer detects a maximum AF evaluation value and two AF evaluation values smaller than that value, and determines a deviation of a maximum evaluation position corresponding to the maximum AF evaluation value from a focal point. If the deviation is small, the micro-computer takes the maximum evaluation position as an optimal position. On the other hand, if the deviation is large, the micro-computer takes as an optimal position a position deviated by a second predetermined amount from the maximum evaluation position.

13 Claims, 15 Drawing Sheets

10
MOTOR DRIVE CIRCUIT
18
12
CCD IMAGER
20
TG
12
A/D
24
RAM
26
MEMORY CONTROL
28
WEIGHTING AMOUNT TABLE
34
ARITHMETIC OPERATION
30
Y
R-Y, B-Y
WEIGHTING
32
GATE CIRCUIT
42
HPF
44
INTEGRATION
36
INTEGRATION
46
ARITHMETIC OPERATION
38
MICRO-COMPUTER
40
40a
40b
40c
RELEASE BUTTON
54
MODE SET BUTTON
52
SIGNAL PROCESSING
48
RECORDING MEDIUM
50
SW1
MOTOR CONTROL SIGNAL
GATE CIRCUIT
SHUTTER SPEED INSTRUCTING SIGNAL

| Mg | G | Mg | G | Mg | G | Mg | G | | Mg | G |
|---|---|---|---|---|---|---|---|---|---|---|
| Ye | Cy | Ye | Cy | Ye | Cy | Ye | Cy | | Ye | Cy |
| Mg | G | Mg | G | Mg | G | Mg | G | | Mg | G |
| Ye | Cy | Ye | Cy | Ye | Cy | Ye | Cy | | Ye | Cy |
| Mg | G | Mg | G | Mg | G | Mg | G | | Mg | G |
| Ye | Cy | Ye | Cy | Ye | Cy | Ye | Cy | | Ye | Cy |
| Mg | G | Mg | G | Mg | G | Mg | G | | Mg | G |
| Ye | Cy | Ye | Cy | Ye | Cy | Ye | Cy | | Ye | Cy |
| | | | | | | | | | | |
| Mg | G | Mg | G | Mg | G | Mg | G | | Mg | G |
| Ye | Cy | Ye | Cy | Ye | Cy | Ye | Cy | | Ye | Cy |

START
RELEASE APERTURE STOP
S1
INITIALIZE EXPOSURE TIME
S3
PRE-EXPOSURE
S5
FETCH LUMINANCE EVALUATION VALUE Ya
S7
CALCULATE OPTIMAL EXPOSURE TIME
S9
DETERMINE EXPOSURE TIME FOR MAIN EXPOSURE
S10
INITIALIZE COUNT VALUE (CNT = 1)
S11
S13
LOW LUMINANCE?
NO
YES
SET FLAG
S15
RESET FLAG
S17
A

A
S19
FLAG SET?
YES
YES
S25
EXPOSURE TIME = 1/15 SECOND
S21
NO
EXPOSURE TIME > 1/30 SECOND?
EXPOSURE TIME = 1/30 SECOND
S23
POSITION AF LENS AT INITIAL POSITION
S27
L(1) ← POSITION DATA
S29
S31
HEAD OF 1 FRAME?
NO
YES
PRE-EXPOSURE
S32
S33
NO
FLAG SET?
YES
S35
HEAD OF 1 FRAME?
NO
YES
S37
HEAD OF 1 FRAME?
NO
YES
B

B
MOVE AF LENS
S39
D(2) ← POSITION DATA
S41
PRE-EXPOSURE
S42
S43
HEAD OF 1 FRAME?
NO
YES
FETCH AF EVALUATION VALUE
S45
D(CNT) ← AF EVALUATION VALUE
S47
YES
S49
NO
FLAG SET?
S51
HEAD OF 1 FRAME?
NO
YES
MOVE AF LENS
S53
L(CNT+2) ← POSITION DATA
S55
INCREMENT CNT
S57
S59
NO
CNT > A?
YES
B

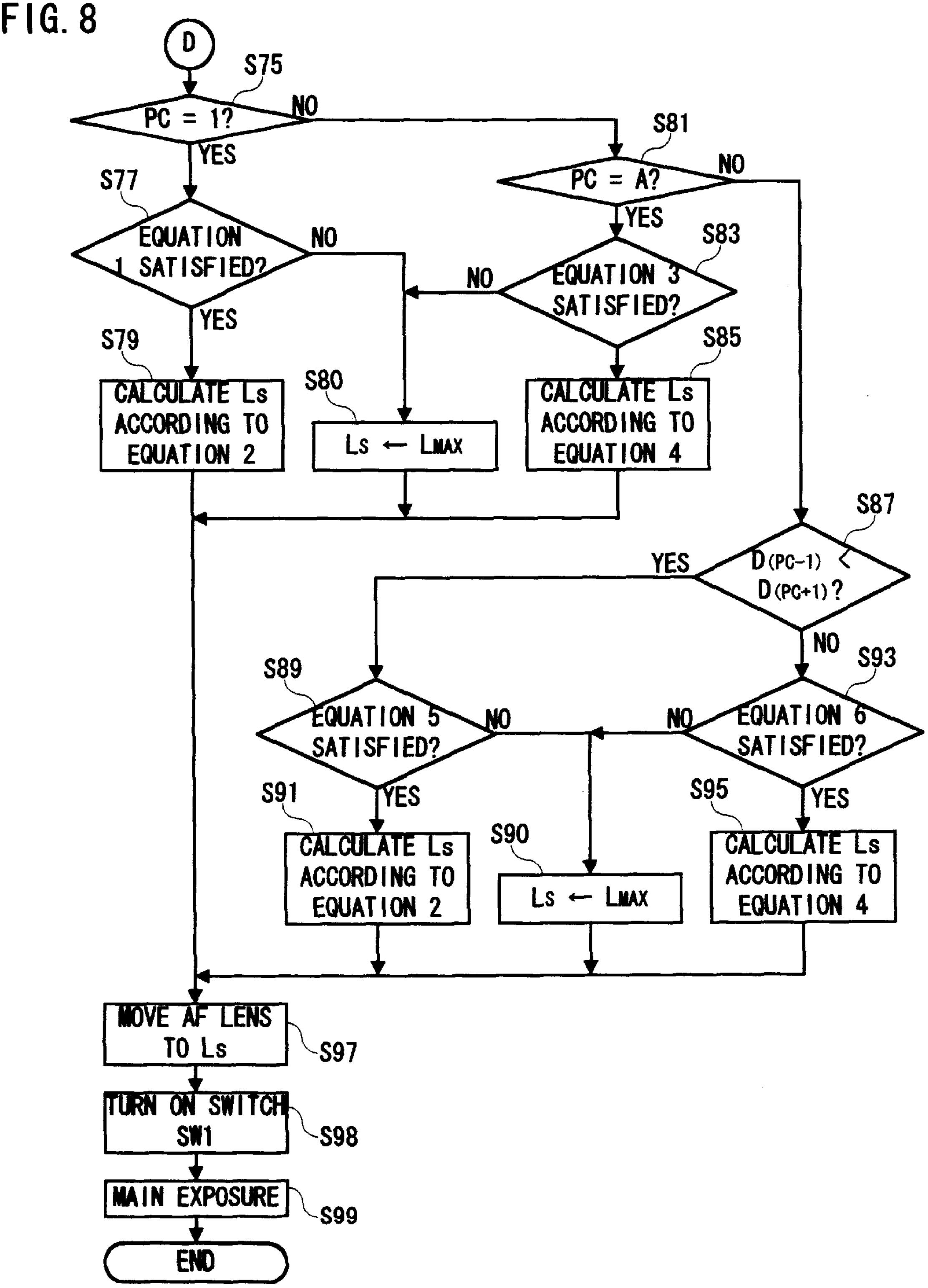
FIG. 8
D
S75
PC = 1?
NO
YES
S77
EQUATION 1 SATISFIED?
NO
YES
S79
CALCULATE Ls ACCORDING TO EQUATION 2
S80
Ls ← LMAX
S81
PC = A?
NO
YES
S83
EQUATION 3 SATISFIED?
NO
S85
CALCULATE Ls ACCORDING TO EQUATION 4
S87
D(PC−1) < D(PC+1)?
YES
NO
S89
EQUATION 5 SATISFIED?
NO
YES
S93
EQUATION 6 SATISFIED?
NO
YES
S91
CALCULATE Ls ACCORDING TO EQUATION 2
S90
Ls ← LMAX
S95
CALCULATE Ls ACCORDING TO EQUATION 4
MOVE AF LENS TO Ls
S97
TURN ON SWITCH SW1
S98
MAIN EXPOSURE
S99
END LENS POSITION NO.
①
②
③
④
① DATA INTEGRATION
② DATA INTEGRATION
③ DATA INTEGRATION
④ DATA INTEGRATION
AF LENS POSITION
AF LENS INITIAL POSITION
① FETCHING AF EVALUATION VALUE
② FETCHING AF EVALUATION VALUE
③ FETCHING AF EVALUATION VALUE
④ FETCHING AF EVALUATION VALUE LENS POSITION NO.
AF LENS POSITION
①
①
②
② ① DATA INTEGRATION
① FETCHING AF EVALUATION VALUE
③ ② DATA INTEGRATION
② FETCHING AF EVALUATION VALUE
③
③ ③ DATA INTEGRATION

| COUNT VALUE CNT | POSITION DATA L(CNT) | AF EVALUATION VALUE D(CNT) |
|---|---|---|
| 1 | | |
| 2 | | |
| 3 | | |
| 4 | | |
| 5 | | |
| 6 | | |

AUTO FOCUS CAMERA

BACKGROUND OF THE INVENTION

1. Field of the Invention

The present invention relates to auto focus cameras, and more particularly to an auto focus camera which causes a focus lens to change in position relative to a focus sensor by a predetermined amount at a time, and detects focusing-related components at respective positions, thereby effecting focusing control based on the detected focusing-related components.

2. Description of the Prior Art

In the conventional auto focus cameras of this kind, it has been a practice to effect exposure to a photographic subject and detect contrasts on the subject at respective relative positions. From the result of detection, AF evaluation values (focusing-related components) are calculated respectively for the relative positions, in order to determine as an optimal position a relative position at which a maximum AF value is available. That is, the AF evaluation values have a characteristic in a mountain-like form as shown in FIG. 12, wherein a summit thereof corresponds to a focal point. Due to this, the optimal position has been determined from a position at which the AF evaluation value assumes a maximum in value.

In such a prior art, however, the increase in amount of one relative position change also increases a deviation of a relative position corresponding to a maximum evaluation value from a focal point. As a result, there has been a problem that an optimal position even if once determined included deviation with respect to the focal point.

SUMMARY OF THE INVENTION

It is therefore a primary object of the present invention to provide a novel auto focus camera.

It is another object of the present invention to provide an auto focus camera which can be decreased in positional deviation of an optimal lens position from a focal point even if an amount in one movement of a focal lens is taken comparatively great.

According to the present invention, an auto focus camera, comprises: a focus lens; a focus sensor; a position changing means for changing a relative position of said focus lens to said focus sensor by a first predetermined amount at a time; a detecting means for detecting respective focusing-related components at a plurality of relative positions changed by said position changing means; a specifying means for specifying a maximum focusing-related component and two focusing-related components smaller than the maximum focusing-related component from among components detected by said detecting means; a determining means for determining a deviation of a maximum component position corresponding to the maximum focusing-related component from a focal point depending upon the three components specified by said specifying mean; and a judging means for judging an optimal position depending upon a result of determination by said determining means.

According to the present invention, a relative position of the focus lens to the focus sensor is changed by the first predetermined amount a time by the position changing means. Focusing-related components are detected at respective positions by the detecting means. The specifying means specifies a maximum focusing-related component and two focusing-related components smaller than the maximum focusing-related component from among detected components. Also, the determining means determines a deviation of a maximum component position corresponding to the maximum focusing-related component from a focal point. The judging means judges an optimal position depending upon a result of determination by the determining means.

In one aspect of the present invention, the determining means determines any of the following. That is, a first calculating means calculates a first difference between the maximum focusing-related component and one of the two focusing-related components, and a second calculating means calculates a second difference between the maximum focusing-related component and the other of the two focusing-related components. A first difference comparing means compares the first difference and the second difference with each other to determine the deviation.

In one embodiment of the present invention, said determining means takes as the optimal position a position deviated by a second predetermined amount from the maximum component position when a ratio of the first difference to the second difference is greater than a predetermined value. On the other hand, said determining means takes the maximum component position as the optimal position when the ratio of the first difference to the second difference is smaller than a predetermined value. Incidentally, the second predetermined amount is a half of the first predetermined amount.

In another aspect of the present invention, the determining means determines a deviation as follows. That is, a third calculating means calculates a third difference between the maximum focusing-related component and a second-greatest focusing-related component, and a fourth calculating means calculates a fourth difference between the second-greatest focus-related component and a remaining focus-related component. A second difference comparing means compares the third difference and the fourth difference with each other to determine the deviation.

In another embodiment of the present invention, said determining means takes as the optimal position a position deviated by a third predetermined amount from the maximum component position when a ratio of the third difference to the fourth difference is greater than a predetermined value. On the other hand, the determining means takes the maximum component position as the optimal position when the ratio of the third difference to the fourth difference is smaller than a predetermined value. Incidentally, the third predetermined amount is a half of the first predetermined amount.

In another aspect of the present invention, a position comparing means compares the maximum component position with change start and end positions from and to the relative position. A first enabling means enables said first calculating means, said second calculating means and said first difference comparing means when the maximum component position is different from the change start position or change end position. On the other hand, a second enabling means enables said third calculating means, said fourth calculating means and said second difference comparing means when the maximum component position is coincident with the change start position or change end position.

According to the present invention, the deviation of a maximum component position from a focal point is determined based on a maximum focusing-related component and the two smaller focusing-related components, and an optimal position is judged depending on a result of determination. It is therefore possible to decrease a deviation of an optimal position from a focal point even if the amount in change per time.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an illustrative view showing a complementary color filter;

FIG. 8 is a flowchart showing another part of the operation in the FIG. 1 embodiment;

FIG. 11 is an illustrative view showing a table;

DETAILED DESCRIPTION OF THE PREFERRED EMBODIMENTS

Figure 1:
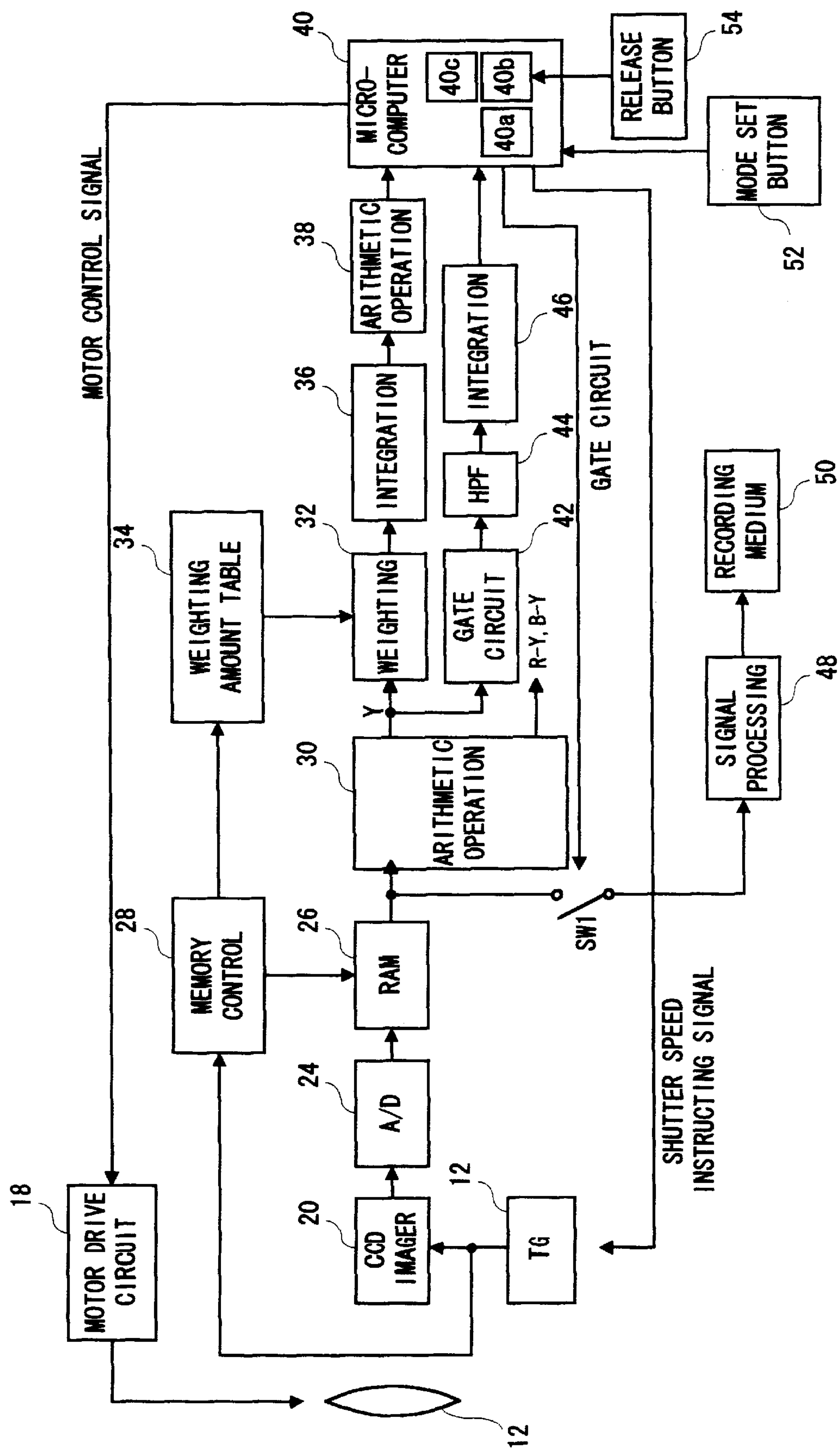
FIG. 1 is a block diagram showing one embodiment of the present invention.
Figure 2:
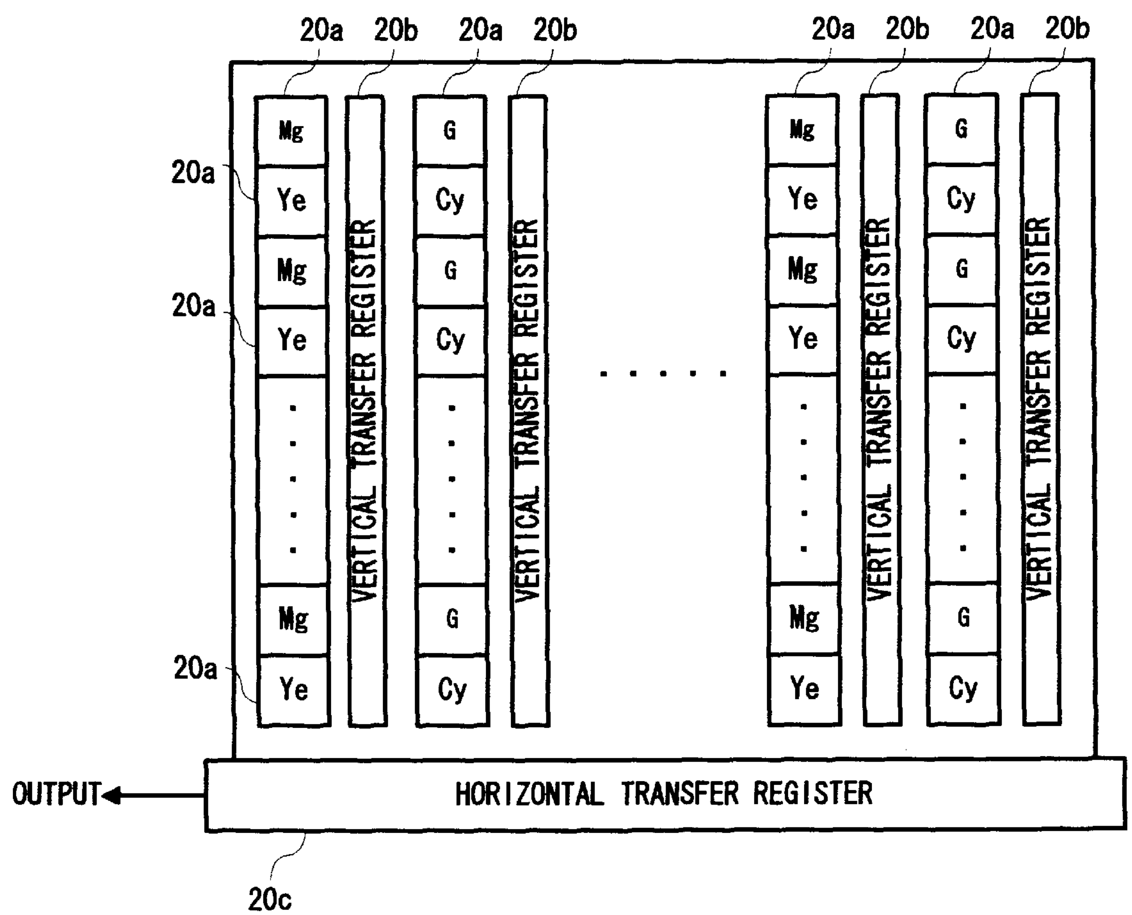
FIG. 2 is an illustrative view showing a CCD imager.
Figure 4:
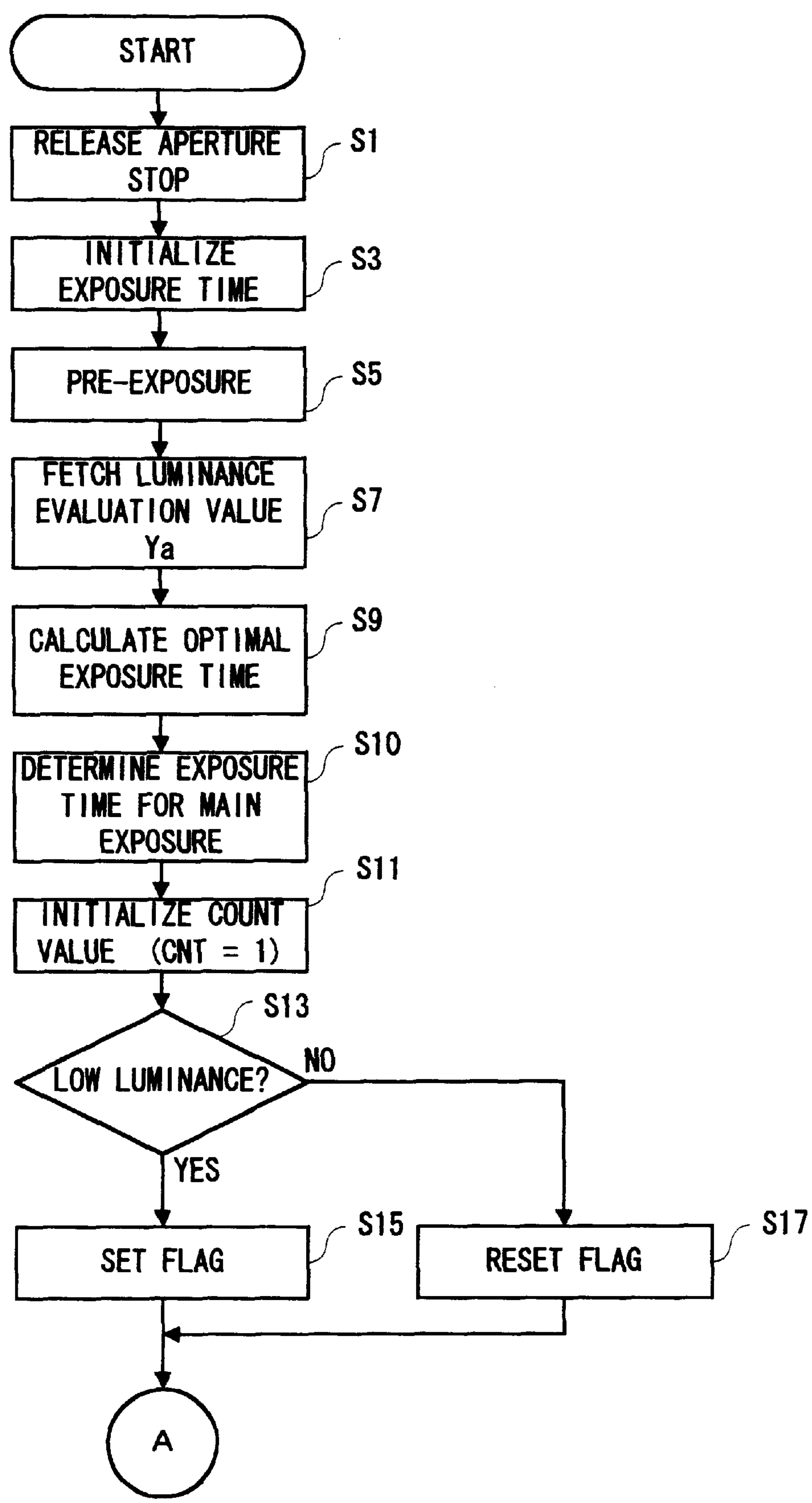
FIG. 4 is a flowchart showing one part of the operation in the FIG. 1 embodiment.
Figure 5:
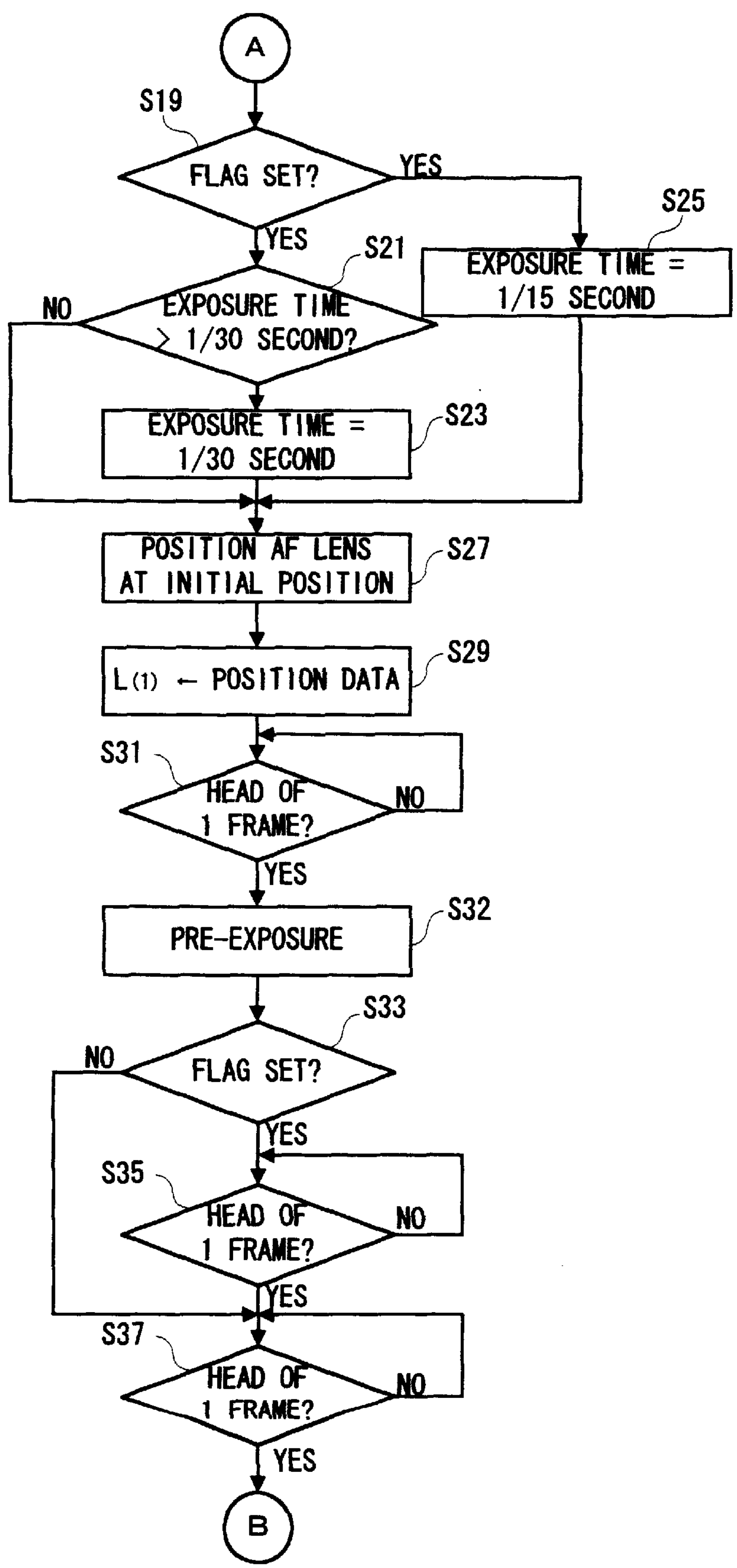
FIG. 5 is a flowchart showing another part of the operation in the FIG. 1 embodiment.
Figure 6:
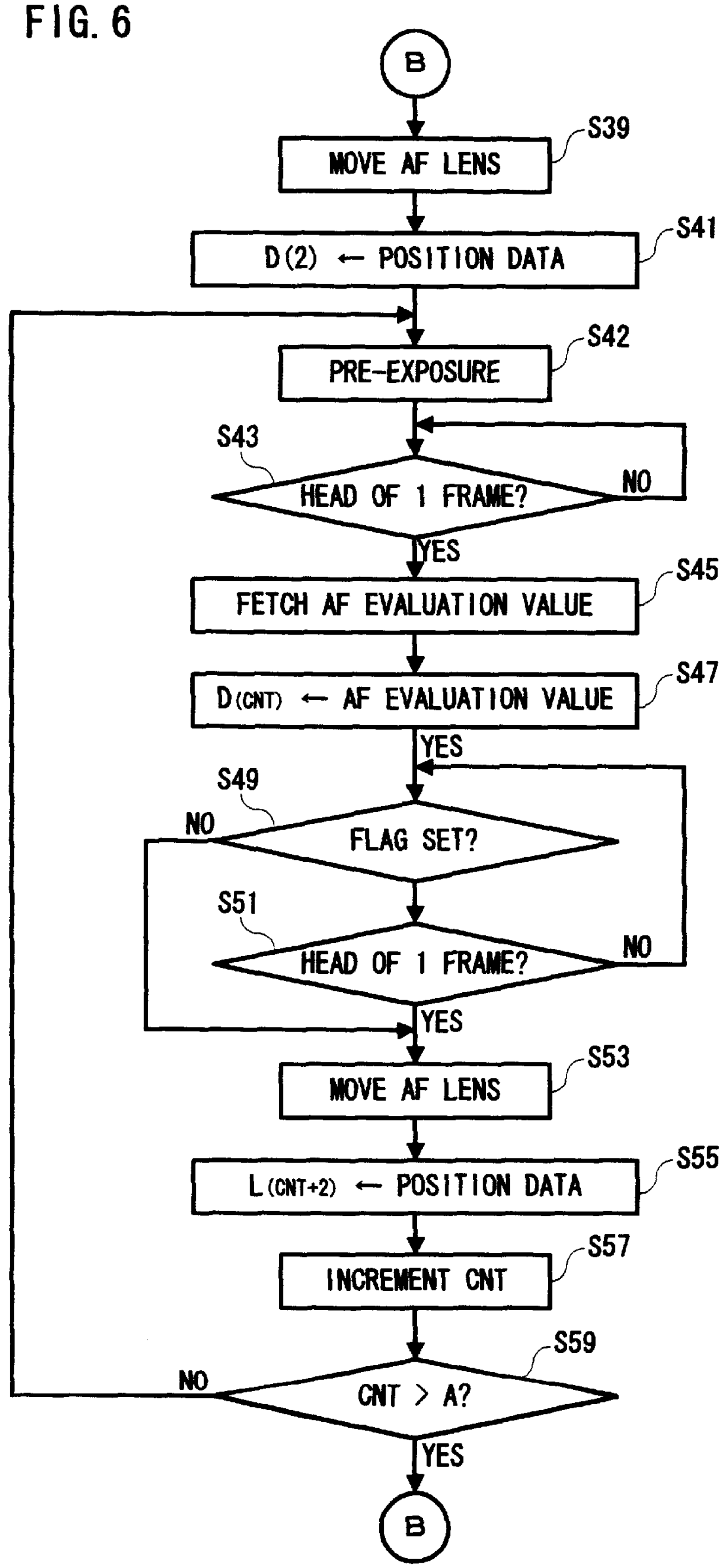
FIG. 6 is a flowchart showing still another part of the operation in the FIG. 1 embodiment.
Figure 7:
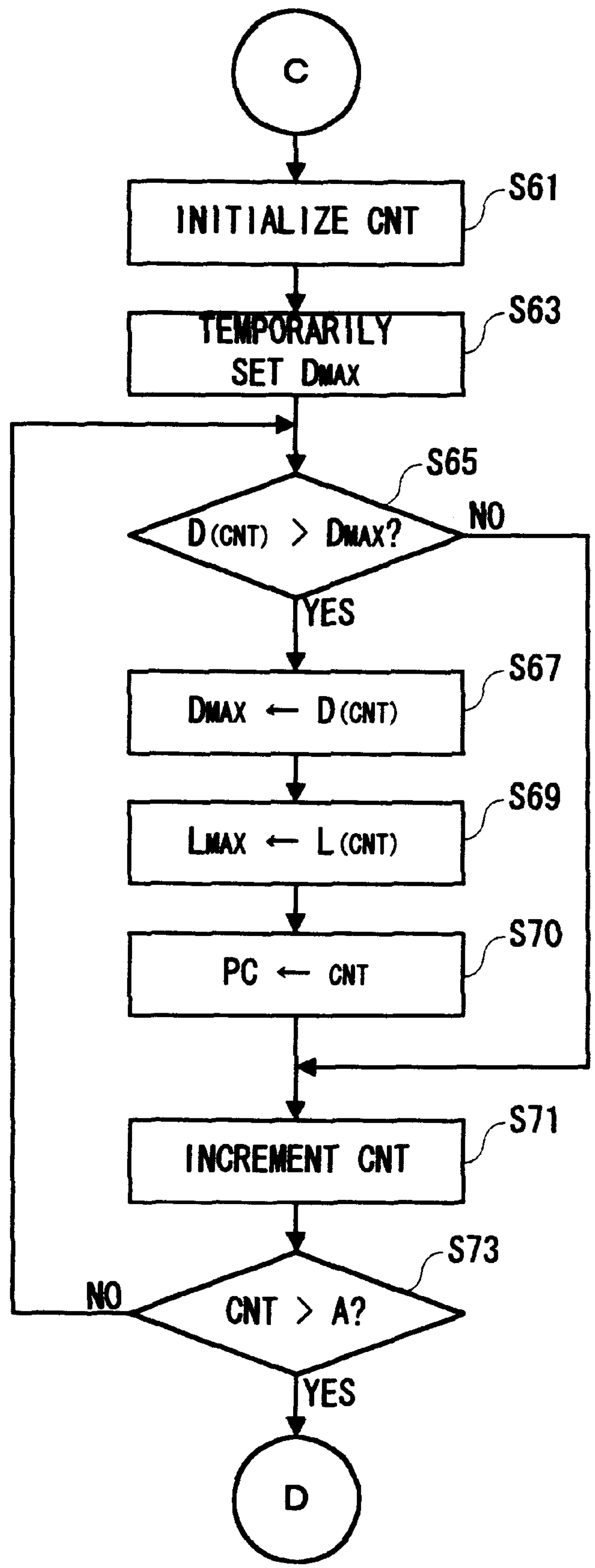
FIG. 7 is a flowchart showing further part of the operation in the FIG. 1 embodiment.

Referring to FIG. 1, a digital camera 10 in this embodiment includes an AF lens 12. An optical image of a photographic subject is taken through the AF lens 12 into a CCD imager 20. The CCD imager 20 is formed with a plurality of light receiving portions 20*a* as shown in FIG. 2. A complementary-color filter 20*d* is provided at the front of the light receiving portions 20*a*, which has Ye, Cy, Mg and G arranged in a mosaic form as shown in FIG. 3. Each light receiving portion 20*a* constitutes a pixel for the CCD imager 20, wherein Ye, Cy, Mg and G are arranged correspondingly to the light receiving portions 20*a*. Thus, the incoming optical image is given through the complementary-color filter 20*d* to the light receiving portions 20*a* of the CCD imager 20 where it is subjected to photoelectric conversion.

Explaining in detail on the CCD imager 20, the CCD imager 20 includes, as shown in FIG. 2, a plurality of light receiving portions 20*a* corresponding to pixels, a plurality of vertical transfer registers 20*b* for vertically transferring the electric charges having been photoelectrically converted by and stored on the light receiving portion 20*a*, and a horizontal transfer register 20*c* arranged at the ends of the vertical transfer registers 20*b* to transfer the electric charges having been transferred through the vertical transfer register 20*b*. The CCD imager 20 is driven by a timing signal outputted from a timing generator 22. Here, the timing signal includes a read-out pulse to read electric charges from the light receiving portion 20*a* onto the vertical transfer register 20*b*, a vertical transfer pulse to vertically transfer the electric charges on the vertical transfer register 20*b*, a horizontal transfer pulse to horizontally transfer the electric charges on the horizontal transfer register 20*c*, a sweep-out pulse to sweep the electric charges generated by the light receiving portion 20*a* to an overflow drain (not shown) during a time of out of exposure or out of charge storage.

The timing generator 22 controls a time period of outputting a sweep-out pulse, responsive to a shutter speed instruction signal outputted from the micro-computer 40. Due to this, the charge storage time is brought under control thereby providing a desired exposure time (shutter speed). Incidentally, the technology to control the exposure time using a sweep-out pulse output time is well known as an electronic shutter function.

In a camera mode, pixel signals outputted from the CCD imager 20 are converted into digital signal pixel data by an A/D converter 24. This pixel data is written onto a RAM 26 by a memory control circuit 28 that operates responsive to a timing signal given from the timing generator 22. The pixel data held in the RAM 26 is thereafter read out by the memory control circuit 28, and inputted to an arithmetic operation circuit 30.

The arithmetic operation circuit 30 is enabled during a time period of pre-exposure, calculating out luminance data (Y data) and chrominance data R-Y and B-Y. The chrominance data thus calculated is inputted to a white-balance adjusting circuit, while the Y data is given to a weighting circuit 32. The weighting circuit 32 multiplies the inputted Y data by a weighting amount held within the weighting amount table 34. The weighting amount table 34 receives reading address data given from the memory control circuit 28, and recognizes from which pixel data the Y data outputted from the arithmetic operation circuit 30 was created, thereby outputting a desired weighting amount. It is possible to realize photometric measurements with center weighting by subjecting the luminance data to weighting using such a weighting amount.

The Y data outputted from the weighting circuit 32 is integrated every 1-frame period (1/30 second) by an integrator 36. An arithmetic calculator 38 divides the integrated data outputted from the integrator 36 by a sum of the weighting amounts, thereby calculating a luminance evaluation value Ya to be evaluated for exposure control.

The micro-computer 40 calculates an optimal exposure time based on an luminance evaluation value Ya inputted from the arithmetic calculator 38. If the optimal exposure time is shorter than 1/30 second, this optimal exposure time is taken as an exposure time to be applied for main exposure or taking a picture. On the other hand, if the optimal exposure time is longer than 1/30 second, the micro-computer 40 determines the exposure time for a main exposure at 1/30 second, supplementing an insufficiency of exposure with using strobe light (not shown).

After determining the exposure time for a main exposure, a time period for an AF control pre-exposure is determined based on the above optimal exposure time. If the optimal exposure time is shorter than 1/30 second, this optimal exposure time is taken as a pre-exposure time. On the other hand, if the optimal exposure time is longer than 1/30 second but shorter than 1/10 second (3-frame period), the pre-exposure time is set to 1/30 second. If the optimal exposure time is longer than 1/10, the pre-exposure time is set at 1/15 second (2-frame period).

That is, if the optimal exposure time is even longer than 1/30 second but not exceeding 1/10 second, it is possible to properly evaluate a photographic subject by applying a pre-exposure of approximately 1/30 second. Consequently, the pre-exposure is made only for 1/30 second that is equal to a maximum exposure time for a main exposure. However, if the optimal exposure time becomes as long as 1/10 second, the photographic subject cannot be fully evaluated by the pre-exposure time of approximately 1/30 second, thus reducing the AF control accuracy. Due to this, the pre-exposure time is set to 1/15 second that is the twice (integer multiple ) of 1/30 second.

During under AF control, a pre-exposure is effected only for a time period thus determined. The arithmetic operation circuit 30 calculates Y data from the input pixel data. The calculated Y data is inputted to a gate circuit 42. Because focusing must be made for a principal photographic subject, the gate circuit 42 extracts only the Y data on screen center where a principal subject is to occupy, and input the extracted data to a high-pass filter (HPF) 44. In the high-pass filter 44, a high range component in the luminance data, i.e., a subject contrast component, is extracted. This contrast component is integrated every 1/30 or 1/15 second by the integration circuit 46. That is, if a set pre-exposure time is less than 1/30 second, the contrast component is integrated every 1/30 second. If the set pre-exposure time is 1/15 second, the contrast component is integrated every 1/15 second. The integration data outputted from the integration circuit 46 is inputted as an AF evaluation value, or a focus-related component, into the micro-computer 40. Incidentally, where the pre-exposure time under AF control is shorter than a 1-frame period, extra electric charges are swept away by a sweep pulse. Accordingly, there is no especial problem in taking an integrator 46 integration time at the 1-frame period.

The above-described process is carried out at different lens positions, thereby inputting a plurality of AF evaluation values into the micro-computer 40. The micro-computer 40 in turn detects a maximum one of the AF evaluation values as well as smaller ones than that maximum value from among the inputted AF evaluation values, and determines an optimal lens position based on these three AF evaluation values. After determining the optimal lens position, the micro-computer 40 controls a motor drive circuit 18 thereby setting an AF lens 12 to an optimal lens position. Thus, focusing is effected for the principal subject.

If the AF control is completed, the micro-computer 40 turns on the switch SW1 and effects a main exposure. Due to this, the pixel data obtained by the main exposure is supplied through the SW1 to a signal processing circuit 48 where it is subjected to a predetermined process and recorded onto a recording medium 50.

When a release button 48 is half-depressed, the micro-computer 40 starts a flowchart process shown in FIG. 4 to FIG. 8, in order to determine an exposure time for a main exposure as well as a position of the AF lens 12. The micro-computer 40 first releases open the aperture stop in step S1, and initializes an exposure time in step S3. The initial exposure time is 1/250 second. The micro-computer 40 then supplies in step S5 a shutter speed instruction signal to the timing generator 22 to give an exposure time or shutter speed of 1/150 second. A pre-exposure is effected with this shutter speed. Due to this, a luminance evaluation value Ya stated before is calculated.

The micro-computer fetches in step S7 the luminance evaluation value Ya outputted from the arithmetic calculator 38 based on the step S5 pre-exposure, and calculates in step S9 an optimal exposure time. Specifically, the micro-computer 40 compares the luminance evaluation value Ya with a target evaluation value Yt to be obtained under an optimal exposure condition, and calculates an exposure time that the luminance evaluation value Ya coincides with the target evaluation value Yt. For example, assuming that the luminance evaluation value Ya is "50" and the target evaluation value Yt "100", the luminance at present is only a half of the optimal one. As a result, the optimal exposure time is 1/125 second.

In step S10 an exposure time for a main exposure, i.e., an exposure obtained upon fully depressing the release button 54, is determined depending upon whether the calculated optimal exposure time is longer than 1/30 second or not. That is, when the release button 54 is full depressed to obtain record image data, the exposure time should not exceed 1/30 second. Due to this, when the calculated optimal exposure time is longer than 1/30 second, the exposure time for a main exposure is taken 1/30 second. Incidentally, the optimal exposure is 1/30 second or shorter, the optimal exposure time is used as an exposure time for a main exposure.

After determining the main exposure time in this manner, the micro-computer 40 in step S11 initializes a count value of a counter 40*a*. That is, the count value (CNT) is set at "1". The micro-computer 40 then determines in steps S13–S25 a pre-exposure time to be applied under AF control. In the step S13 it is determined whether the luminance of the subject is low or not. Whether low luminance or not is determined depending upon whether the optimal exposure time calculated in the step S9 is longer than 1/10 seconds or not. Low luminance is decided when a sufficient level of an AF evaluation value is not obtained unless exposure is made for 1/10 second or longer, and the process advances to step S15. On the other hand, if the optimal exposure time is less than 1/10 second, the luminance is considered sufficient and the process advances to step S17. In the step S15 a flag 40*b* is set, while in the step S17 the flag 40*b* is reset. That is, the flag 40*b* is set when the subject is low in luminance.

The micro-computer 40 determines in step S19 whether the flag 40*b* has been set or not. If "YES", the pre-exposure time under AF control is set at 1/15 second in step S25 and the process proceeds to step S27. On the other hand, if "NO" in the step S19, it is determined in step S21 whether the optimal exposure time is longer than 1/30 second or not. If "NO" here, the process directly advances to step S27, while if "YES", the exposure time under AF control is set at 1/30 second in step S23 and the process advances to the step S27. That is, when the optimal exposure time is shorter than 1/30 second, the optimal exposure time is taken as a pre-exposure time under AF control.

Figure 9:
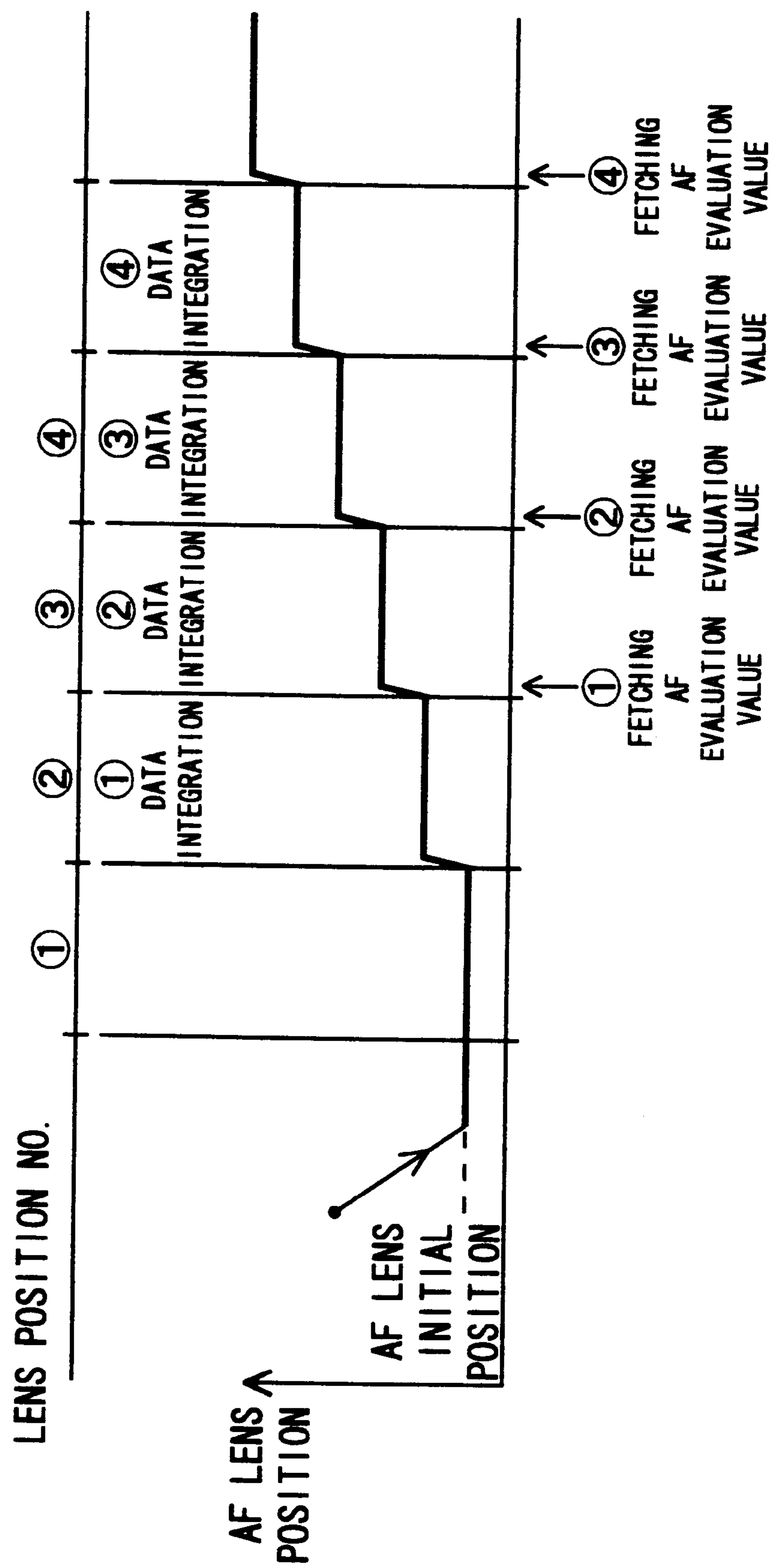
FIG. 9 is an illustrative view showing one part of the operation in the FIG. 1 embodiment.
Figure 10:
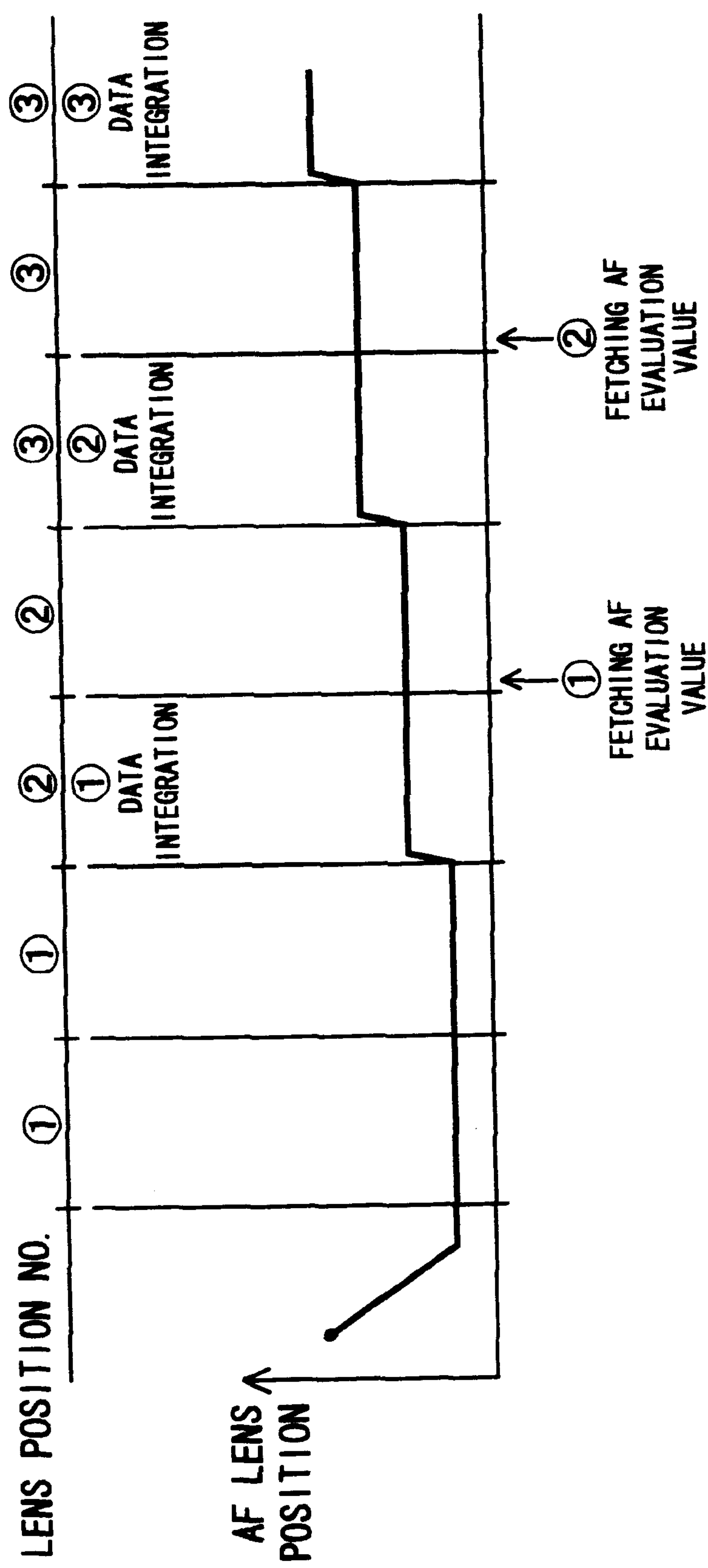
FIG. 10 is an illustrative view showing another part of the operation in the FIG. 1 embodiment.

The micro-computer 40 subsequently causes the AF lens 12 to move to its initial position (movement start position) shown in FIGS. 9 and 10 in step S27, and then puts in step S29 initial position data $L_1$ in correspondence to a count value "1" and then store it into a table 40 shown in FIG. 11. The micro-computer 40 subsequently detects a head of a next 1-frame period, according to a timing signal given from the timing generator 22. If a head of a 1-frame period is detected, "YES" is determined in step S31, and in step S32 a pre-exposure to the photographic subject is performed for the exposure time having been set in the process of steps S19–S25.

Thereafter, it is determined in step S33 whether the flag 40*b* has been set or not. If "NO", the process directly advances to step S37, while if "YES" the process proceeds to the step S37 after waiting for a determination that a 1-frame head has been detected by the step S35. That is, because where the flag 40*b* has been set the pre-exposure is effected over a 2-frame period, the process advances to the step S37 with a delay of the 1-frame period as compared with the case the flag 40*b* has been reset. The process then advances to a next step after a head of a next 1-frame period has been detected. In step S39 the AF lens 12 is moved by a predetermined amount, and in step S41 the position data $L_{(2)}$ on the AF lens 12 is put in correspondence to a count value "2" and written into a table 40*c*. The process of the steps S39 and S41 is effected during a time period ② shown in FIG. 9 or a time period ② shown in FIG. 10.

In step S42 a pre-exposure is made similarly to the step S32, and then it is determined in step S43 whether a head of a 1-frame period has been detected or not. If "YES" here, in step S45 an AF evaluation value on the subject image is fetched which has been exposed before moving the AF lens 12. Then in step S47 this AF evaluation value $D_{(CNT)}$ is put in correspondence to a current count value and written into the table 40*c*. Subsequently it is determined in step S49 whether the flag 40*b* has been set or not. If "NO", the process directly advances to step S53, while if "YES" the process proceeds to the step S53 through a process of step S51, i.e., with a delay of a 1-frame period.

In the step S53 the micro-computer 40 causes the AF lens 12 to move by a predetermined amount. In the next step S55 the position data $L_{(CNT+2)}$ on the AF lens after movement is put in correspondence to a count value of a current count value +2, and stored into the cable 40*c*. In step S57 the counter 40*a* is incremented, and it is determined in step S59 whether the current count value has exceeded a predetermined value A (=6) or not. If "NO", it is considered that fetching AF evaluation values has not been completed for all the lens positions, and the process returns to the step S42. However, if "YES", it is considered that the AF lens 12 has moved up to a movement end position and all the AF evaluation values have been obtained, and the process advances to step S61.

Figure 12:
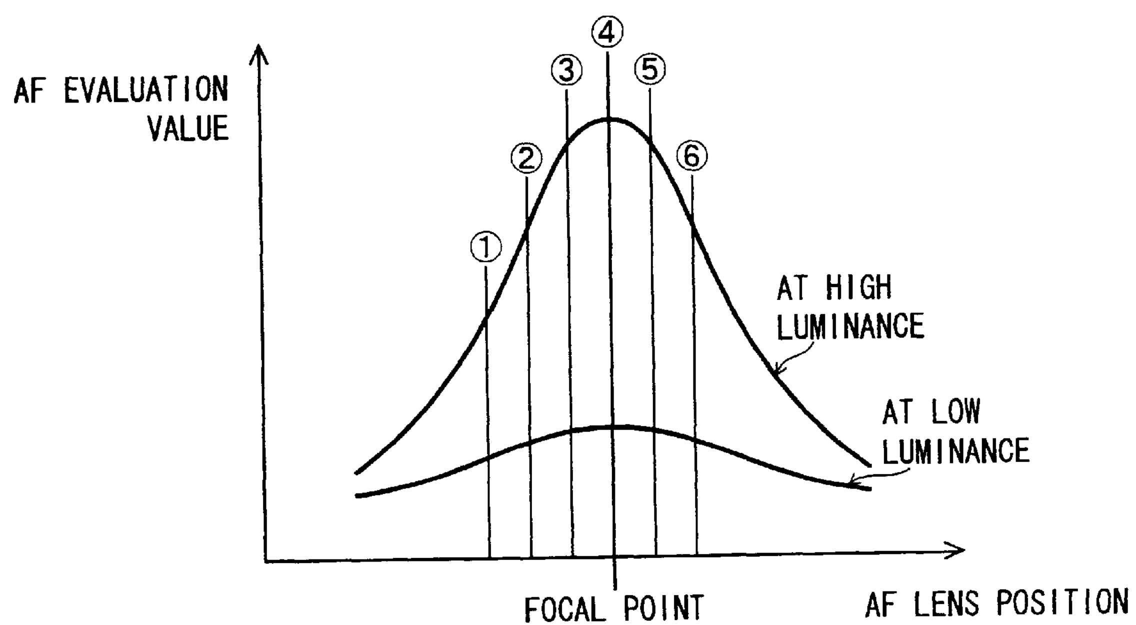
FIG. 12 is a graph showing a relationship between an AF lens position and an AF evaluation value.

In this manner, in the steps S11–S59 the AF lens 12 is moved by a predetermined amount a time wherein AF evaluation values are fetched at respective positions. That is, AF evaluation values are detected at six lens positions as shown in FIG. 12. The calculation of the AF evaluation value requires a 1-frame period so that in both cases of FIG. 9 and FIG. 10 an AF evaluation value on the subject image exposed before movement is obtained with a delay of a 1-frame period from the time of the movement of the AF lens 12 to its next position. Because there is such a deviation in time between the movement of AF lens 12 and the fetching of the AF evaluation value, there is also a difference between the count value put in correspondence to the AF evaluation value in the step S47 and the count value put in correspondence to lens position data in the step S55. Incidentally, the numerals shown in FIG. 9, FIG. 10 and FIG. 12 denote a lens position.

The micro-computer 40, in step S61 and later, determines a deviation of between a focal point as shown in FIG. 12 and a particular lens position corresponding to a maximum AF evaluation value, thereby moving the AF lens 12 to the optimal lens position. First in the step S61, a count value of the counter 40*a* is set at an initial value (=1). In step S63 a maximum AF evaluation value $D_{MAX}$ is set as a temporary value. Subsequently it is determined in step S65 whether an AF evaluation value $D_{(CNT)}$ in current count value is greater than a maximum AF evaluation value $D_{MAX}$. If "NO", the process directly advances to step S71. However, if "YES", in step S67 the maximum AF evaluation value $D_{MAX}$ is renewed by the current AF evaluation value $D_{(CNT)}$, and in step S69 a position given by current position data $L_{(CNT)}$ is rendered as a particular lens position $L_{MAX}$. Then in step S70 the current count value is rendered as a peak count value PC. Thereafter in step S71 the count value is incremented, and in step S73 it is determined whether the count value has exceeded the predetermined value A or not. If "NO" here, the process returns to the step S65 to repeat the above process. If the comparison between the maximum AF evaluation value $D_{MAX}$ and each AF evaluation value $D_{(CNT)}$ has been completed, the determination "YES" is made in the step S73.

After determining the maximum AF evaluation value $D_{MAX}$ in this manner, the micro-computer 40 determines a deviation between a focal point and a particular lens position $L_{MAX}$ based on the maximum AF evaluation value $D_{MAX}$ and the smaller two AF evaluation values, thereby determining an optimal lens position from the determination result.

The micro-computer 40 determines whether the peak count value PC is "1" or not and it is "A" or not, in respective steps S75 and S81. If "YES" in the step S75, the micro-computer 40 determines the particular lens position is equal to a movement start position. It is determined in step S77 whether the AF evaluation values stored within the table 40*c* satisfy Equation 1 or not.

$$\frac{D_{(2)} - D_{(3)}}{D_{(1)} - D_{(2)}} > a_1 \quad \text{[Equation 1]}$$

Figure 13A:
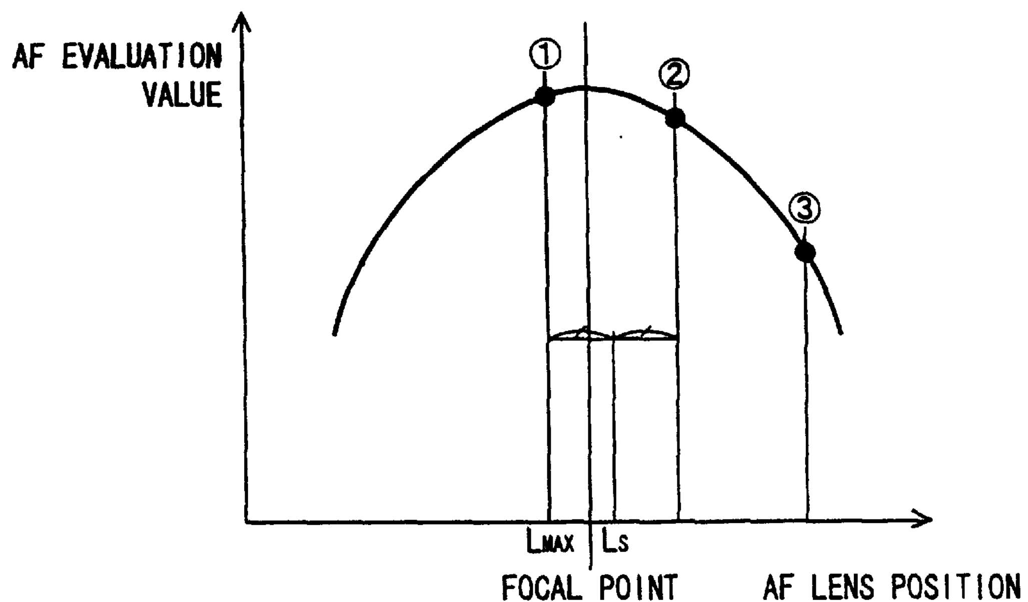
FIG. 13 is a graph showing one example of a relationship between a lens position and an AF evaluation value.
Figure 14A:
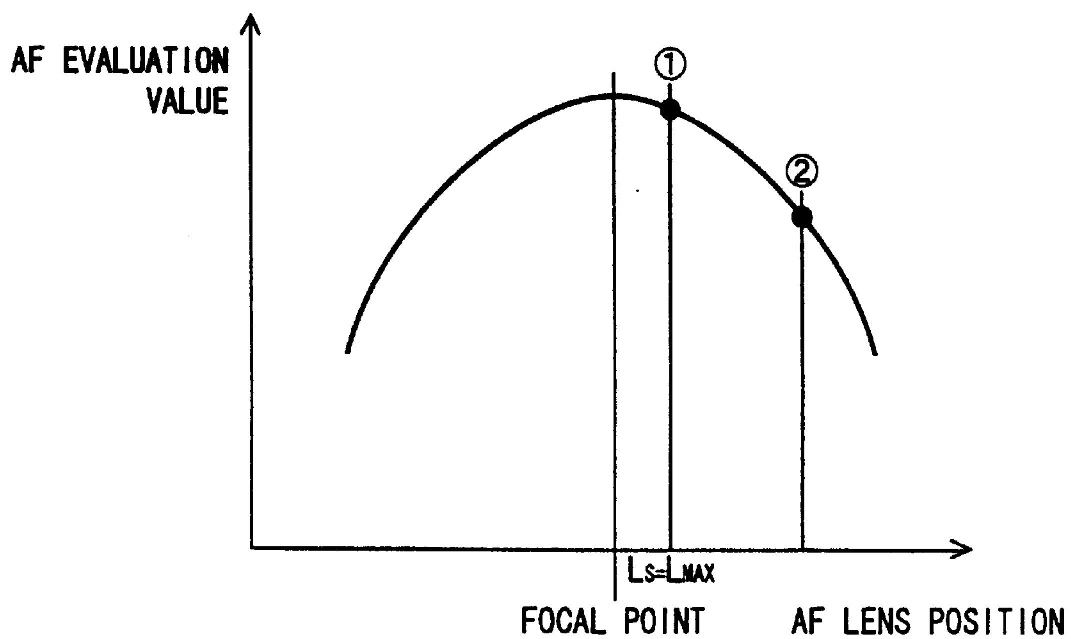
FIG. 14 is a graph showing another example of a relationship between a lens position and an AF evaluation value.

That is, if the peak count value PC is "1", the AF evaluation values $D_{(1)}$–$D_{(3)}$ have a characteristic as shown in FIG. 13(A) or FIG. 14(A). Lens position numbers ①–③ correspond to count values "1"–"3". With Equation 1, calculated is a difference between the AF evaluation values $D_{(1)}$ and $D_{(2)}$ and a difference between the AF evaluation values $D_{(2)}$ and $D_{(3)}$, and compared are these differences. It is then determined whether the comparison result, i.e., $[D_{(2)}-D_{(3)}]/[D_{(1)}-D_{(2)}]$ is greater than a predetermined value a1 or not. If the comparison result is greater than the predetermined value a1, the AF evaluation values $D_{(1)}$–$D_{(3)}$ have a characteristic as shown in FIG. 13(A). On the other hand, if the comparison result is smaller than the predetermined value a1, the AF evaluation values $D_{(1)}$–$D_{(3)}$ have a characteristic shown in FIG. 14(A). In FIG. 13(A), a focal point exists between lens position numbers ① and ②, wherein there is a room to move the AF lens 12 toward the focal point. However, in FIG. 14(A) the focal point exists on a left side of lens position number ①, and accordingly, the AF lens 12 can no longer be moved toward the focal point.

Accordingly, where the characteristic lies as shown in FIG. 13(A), the micro-computer 40 determines "YES" in step S77, and calculates an optimal lens position $L_S$ according to Equation 2 in step S79. After determining an optimal lens position $L_S$ in this manner, the micro-computer 40 causes the AF lens 12 to move the optimal lens position $L_S$ in step S97.

$$L_S = L_{MAX} + \frac{\text{one} - \text{movement amount}}{2} \quad \text{[Equation 2]}$$

Because the particular lens position $L_{MAX}$ corresponds to the lens position number ①, the AF lens 12 is moved rightward by a half amount of one lens movement according to Equation 2, thus being positioned at a point intermediate between the lens position numbers ① and ②. The position after movement is rendered as an optimal lens $L_S$. Due to this, the lens is moved closer to the focal point. On the other hand, when the AF evaluation values D(1)–D(3) have a characteristic shown in FIG. 14(A), the micro-computer 40 determines "NO" in the step S77, and renders the particular lens position $L_{MAX}$ as an optimal lens position $L_s$ in step S80. Consequently, the AF lens 12 is not moved by the step S97.

After putting the AF lens 12 to the optimal lens position $L_S$ in this manner, the micro-computer 40 turns on the switch SW1 in step S98, and effects a main exposure in step S99, thus ending the process.

Figure 13B:
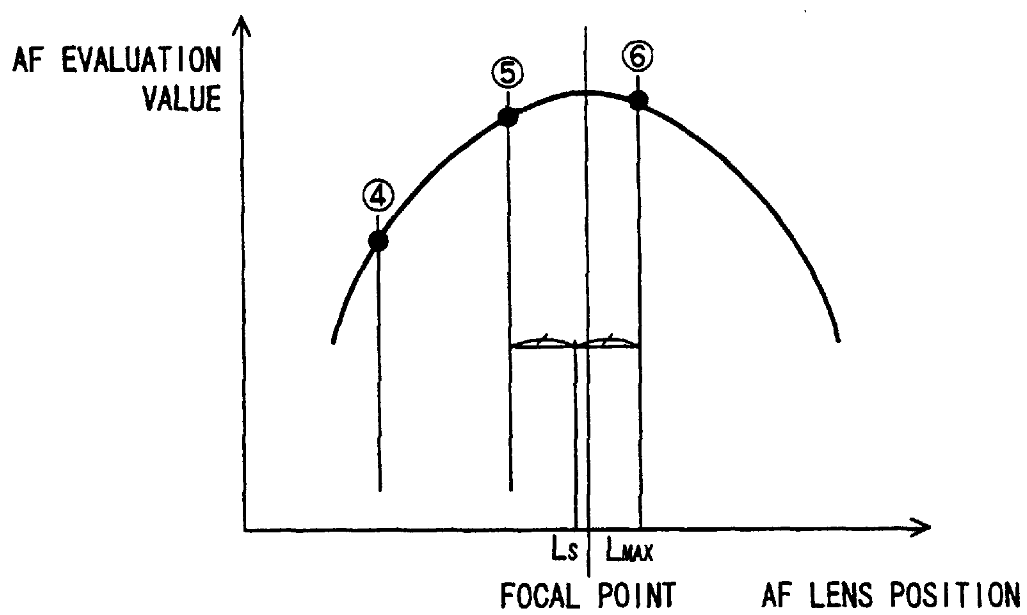
Figure 14B:
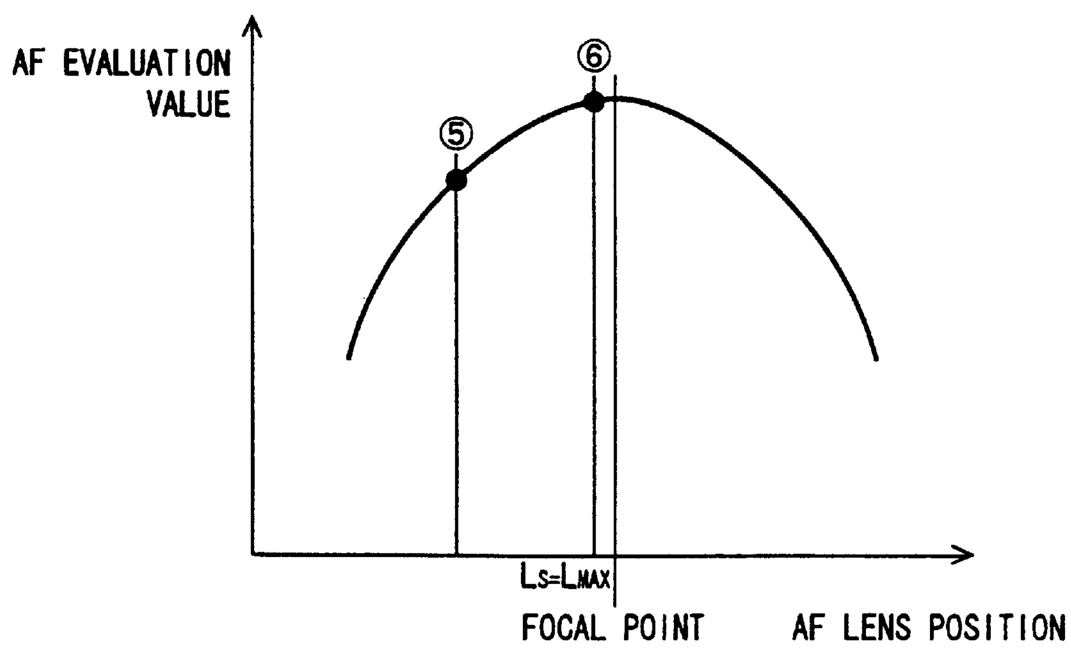

If "YES" in step S81, the particular lens position is equal to a movement end position and the AF evaluation values $D_{(4)}$–$D_{(6)}$ have characteristic shown in FIG. 13(B) or FIG. 14(B). In FIG. 13(B), a focal point exist between lens position numbers ⑤ and ⑥, while in FIG. 14(B) a focal point is on a right side of lens position number ⑥. Due to this, the micro-computer 40 applies the AF evaluation values $D_{(4)}$–$D_{(6)}$ to Equation 3 in step S83, and determines which characteristic of FIG. 13(B) or FIG. 14(B) the AF evaluation values have.

$$\frac{D_{(5)} - D_{(4)}}{D_{(6)} - D_{(5)}} > a_1 \quad \text{[Equation 3]}$$

In Equation 3, a difference between the AF evaluation values $D_{(6)}$ and $D_{(5)}$ is compared with a difference between the AF evaluation values $D_{(5)}$ and $D_{(4)}$. If the comparison result has a value greater than the predetermined value a1, these AF evaluation values have a characteristic as shown in FIG. 13(B), and the process advances to step S85. In the other hand, if the comparison result is smaller than the predetermined value a1, the evaluation values are considered to have a characteristic as shown in FIG. 14(B), and the process advances to step S80.

In step S85, an optimal lens position address is calculated according to equation 4.

$$L_S = L_{MAX} - \frac{\text{one} - \text{movement amount}}{2} \quad \text{[Equation 4]}$$

That is, the particular lens position $L_{MAX}$ is subtracted by a half in amount of one lens movement, and the subtraction result is rendered as an optimal lens position $L_S$. The particular lens position $L_{MAX}$ corresponds to the lens position number ⑥ shown in FIG. 13(B), and a point intermediate between the lens position numbers ⑤ and ⑥ can be determined according to Equation 4. Due to this, the optimal lens position $L_S$ is put closer to the focal point than the particular lens position $L_{MAX}$. Incidentally, where the evaluation values have a characteristic as shown in FIG. 14(B), the AF lens 12 can no longer move toward the focal point. Accordingly, the micro-computer 40 takes the particular lens position $L_{MAX}$ as an optimal lens position $L_S$ in the step S80. After determining the optimal lens position $L_S$ in this manner, the micro-computer 40 causes the AF lens 12 to move to the optimal lens position $L_S$ in step S97. In step S98 the switch SW1 is turned on, and in step S99 a main exposure is effected, ending the process.

Figure 15A:
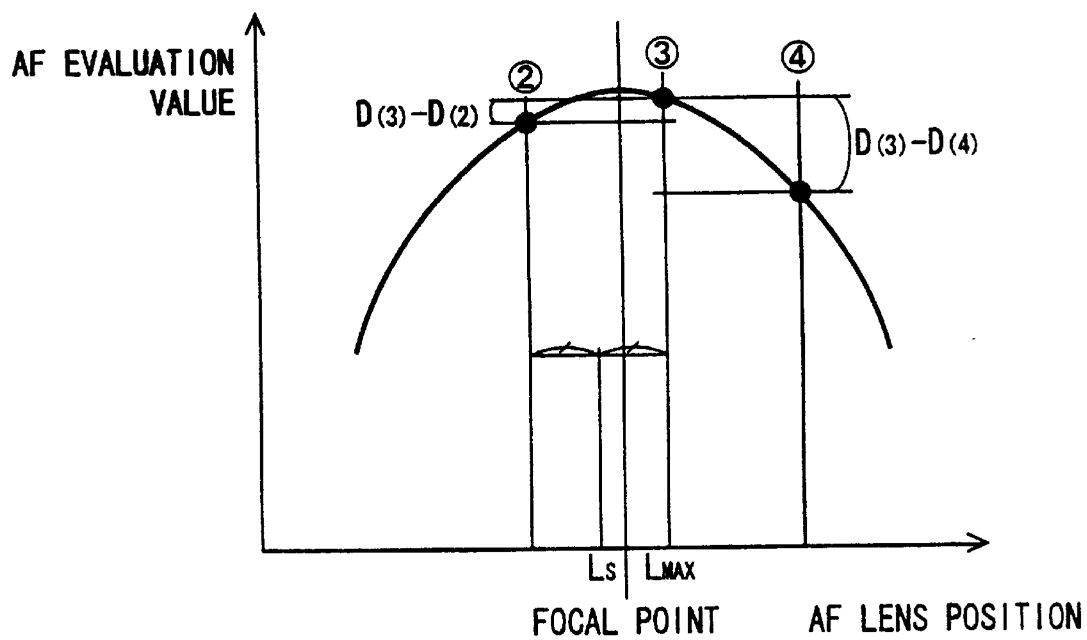
FIG. 15 is a graph showing a further example of a relationship between a lens position and an AF evaluation value.
Figure 15B:
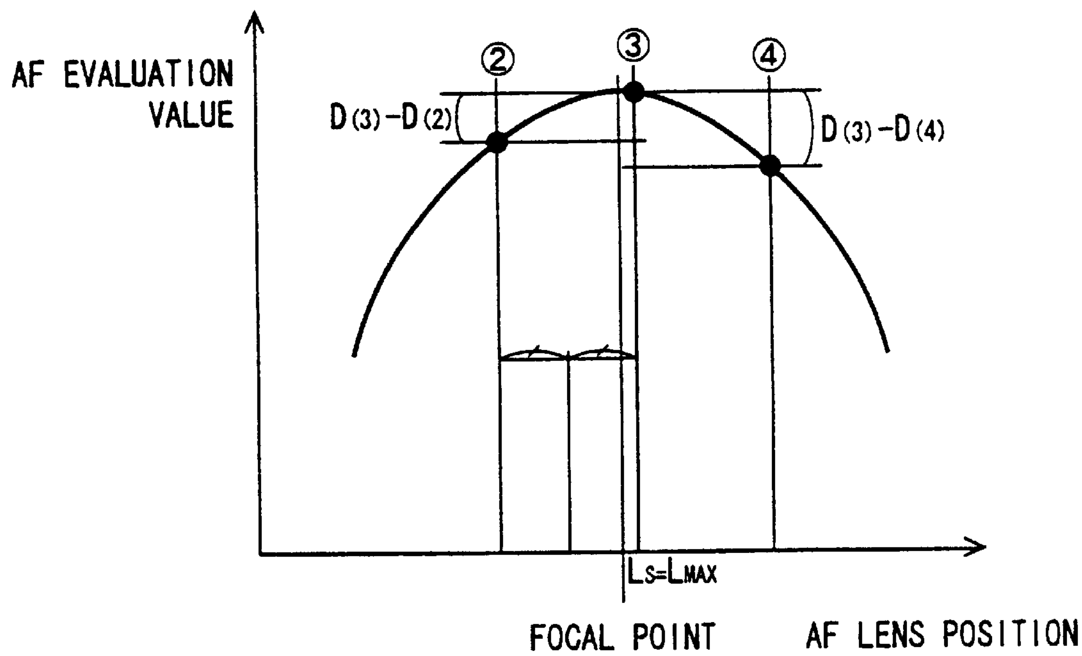

If the peak count value PC is "1" nor "A", the AF evaluation values have a characteristic as shown in FIG. 15(A) or 15(B). That is, the lens position number corresponding to the maximum AF evaluation value $D_{MAX}$ is for example ③, instead of ① or ⑥. In this case, the micro-computer 40 first determines in step S87 whether an AF evaluation value $D_{(PC-1)}$ is smaller than an AF evaluation value $D_{(PC+1)}$ or not. If "YES" here, it is determined in step S89 whether each AF evaluation value satisfies Equation 5 or not. If "NO" in step S87, it is determined in step S93 whether each AF evaluation value satisfies Equation 6 or not.

$$\frac{D_{(PC)} - D_{(PC-1)}}{D_{(PC)} - D_{(PC+1)}} > a_2 \quad \text{[Equation 5]}$$

$$\frac{D_{(PC)} - D_{(PC+1)}}{D_{(PC)} - D_{(PC-1)}} > a_2 \quad \text{[Equation 6]}$$

Equation 5 and Equation 6 are different only in that the denominator and the numerator on the left side are reversed, wherein a same AF evaluation value is assigned to the same term. With these Equation 5 and Equation 6, a relationship is determined between a focal point, an optimal lens position and a particular lens position. In the case that AF evaluation values satisfy Equation 6, a focal point is at a position close to a point intermediate between two lens positions ($L_{(2)}$ and $L_{(3)}$) rather than a particular lens position $L_{MAX}$ as shown in FIG. 15(A). On the other hand, if the AF evaluation values do not satisfy Equation 6, a focal point is close to the particular lens position $L_{MAX}$ rather than the intermediate point between the two lens positions.

Due to this, if "YES" in the step S93, the micro-computer 40 determines that the deviation between the particular lens position and the focal point is great, and calculates in step S95 an optimal lens position $L_S$ according to Equation 4. That is, the optimal lens position $L_S$ is determined by subtracting a half amount of one movement from the optimal lens position $L_{MAX}$. On the other hand, if "NO" in the step S93, the micro-computer 40 determines that the deviation between the particular lens position and the focal point is small, and takes in step S90 the particular lens position $L_{MAX}$ as an optimal lens position $L_S$.

Incidentally, if "YES" is determined in the step S89, $L_S$ is calculated according to Equation 2 in step S91. If "NO" in step S89, the particular lens position $L_{MAX}$ is taken as an optimal lens position $L_S$ in step S90.

After calculating the optimal lens position $L_S$ in this manner, the micro-computer 40 causes in step S97 the AF lens 12 to move to the optimal lens position LS. In step S98 the switch SW1 is turned on, and a main exposure is effected in step S99, then ending the process.

According to this embodiment, the deviation between a particular lens position $L_{MAX}$ and a focal point is determined based on a maximum AF evaluation value $D_{MAX}$ and the smaller two AF evaluation values, and an optimal lens position $L_S$ is determined depending upon the determination result. Accordingly, even if the AF lens 12 is set great in one-movement amount, it is possible to decrease the deviation between an optimal lens position $L_S$ and a focal point.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An auto focus camera, comprising:

a focus lens;

a focus sensor;

a position changing means for changing a relative position of said focus lens to said focus sensor by a first predetermined amount at a time;

a detecting means for detecting respective focusing-related components at a plurality of relative positions changed by said position changing means;

a specifying means for specifying a maximum focusing-related component and two focusing-related components smaller than the maximum focusing-related component from among components detected by said detecting means;

a determining means for determining a deviation of a maximum component position corresponding to the maximum focusing-related component from a focal point depending upon the three components specified by said specifying means; and a judging means for judging an optimal position depending upon a result of determination by said determining means.

2. An auto focus camera according to claim 1, wherein said determining means includes a first calculating means for calculating a first difference between the maximum focusing-related component and one of the two focusing-related components, a second calculating means for calculating a second difference between the maximum focusing-related component and the other of the two focusing-related components, and a first difference comparing means for comparing the first difference and the second difference with each other to determine the deviation.

3. An auto focus camera according to claim 2, wherein said determining means includes first determining means which takes as the optimal position a position deviated by a second predetermined amount from the maximum component position when a ratio of the first difference to the second difference is greater than a predetermined value.

4. An auto focus camera according to claim 3, wherein the second predetermined amount is a half of the first predetermined amount.

5. An auto focus camera according to claim 2, wherein said determining means includes second determining means which takes the maximum component position as the optimal position when the ratio of the first difference to the second difference is smaller than a predetermined value.

6. An auto focus camera according to claim 2, wherein said determining means includes a third calculating means for calculating a third difference between the maximum focusing-related component and a second-greatest focusing-related component, a fourth calculating means for calculating a fourth difference between the second-greatest focus-related component and a remaining focus-related component, and a second difference comparing means for comparing the third difference and the fourth difference with each other to determine the deviation.

7. An auto focus camera according to claim 6, wherein said determining means includes a third determining means which takes as the optimal position a position deviated by a third predetermined amount from the maximum component position when a ratio of the third difference to the fourth difference is greater than a predetermined value.

8. An auto focus camera according to claim 7, wherein the third predetermined amount is a half of the first predetermined amount.

9. An auto focus camera according to claim 6, wherein said determining means includes a fourth determining means that takes the maximum component position as the optimal position when the ratio of the third difference to the fourth difference is smaller than a predetermined value.

10. An auto focus camera according to claim 6, further comprising:

a position comparing means for comparing the maximum component position with change start and end positions from and to the relative position;

a first enabling means for enabling said first calculating means, said second calculating means and said first difference comparing means when the maximum component position is different from the change start position or change end position; and a second enabling means for enabling said third calculating means, said fourth calculating means and said second difference comparing means when the maximum component position is coincident with the change start position or change end position.

11. An auto focus camera according to claim 1, wherein said focus sensor is an image sensor.

12. An auto focus camera according to claim 11, wherein said position detecting means causes said focus lens to move by the first predetermined amount at a time.

13. An auto focus camera according to claim 1, wherein said position detecting means causes said focus lens to move by the first predetermined amount at a time.

* * * * *